Aug. 22, 1950  G. W. BARNES, JR  2,519,537
TIME INTERVAL RECORDER
Filed June 7, 1945  4 Sheets-Sheet 1

*INVENTOR.*
GEORGE W. BARNES JR

BY
*C. B. Spangenberg*
ATTORNEY.

Aug. 22, 1950   G. W. BARNES, JR   2,519,537
TIME INTERVAL RECORDER
Filed June 7, 1945                    4 Sheets-Sheet 2
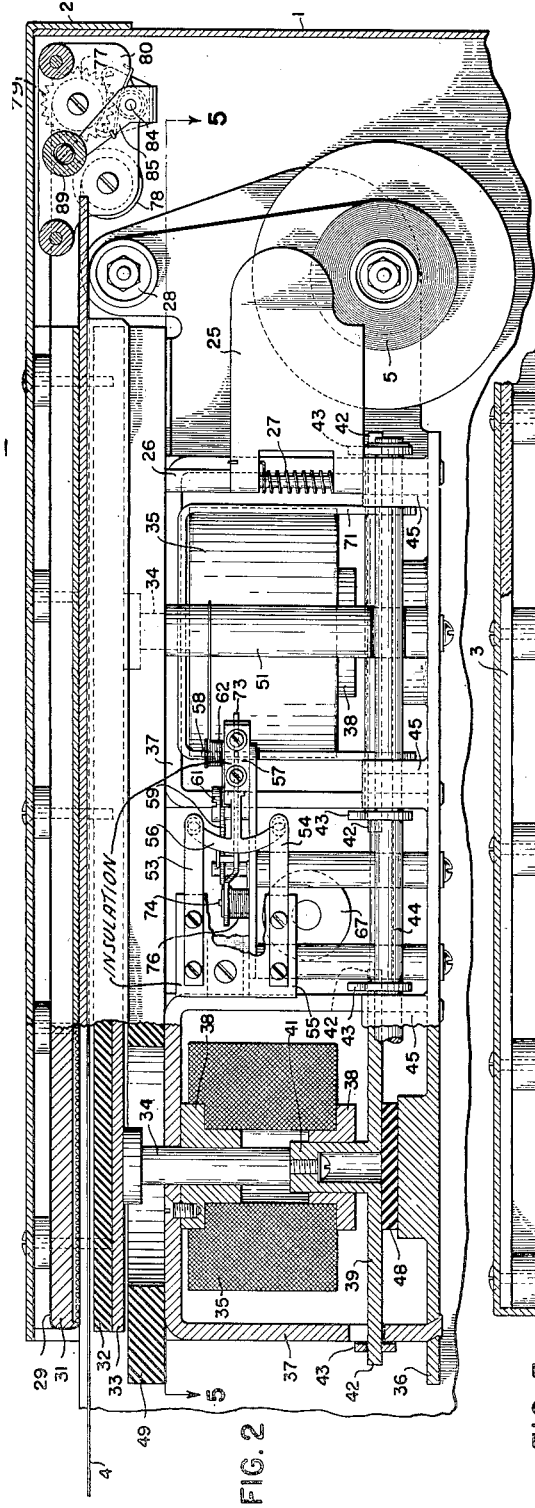
FIG. 2
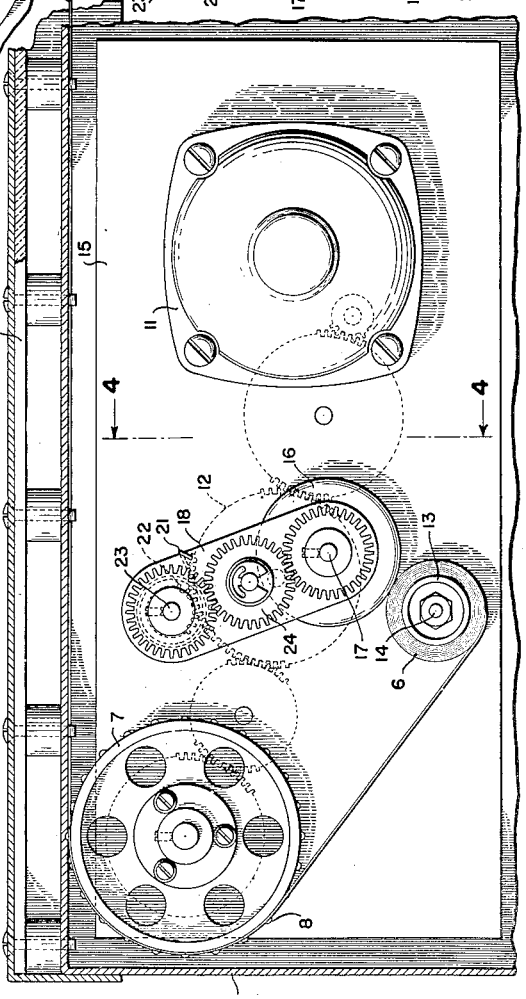
FIG. 4
FIG. 3
INVENTOR.
GEORGE W. BARNES JR
BY
*C. B. Spangenberg*
ATTORNEY.

Aug. 22, 1950 G. W. BARNES, JR 2,519,537
TIME INTERVAL RECORDER
Filed June 7, 1945 4 Sheets-Sheet 3

INVENTOR.
GEORGE W. BARNES JR
BY
Arthur H. Swanson
ATTORNEY.

Aug. 22, 1950
G. W. BARNES, JR
2,519,537
TIME INTERVAL RECORDER
Filed June 7, 1945
4 Sheets-Sheet 4
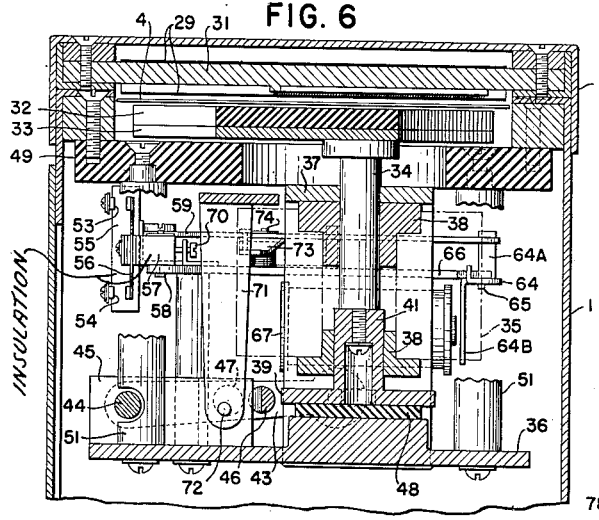
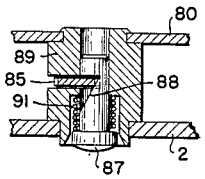
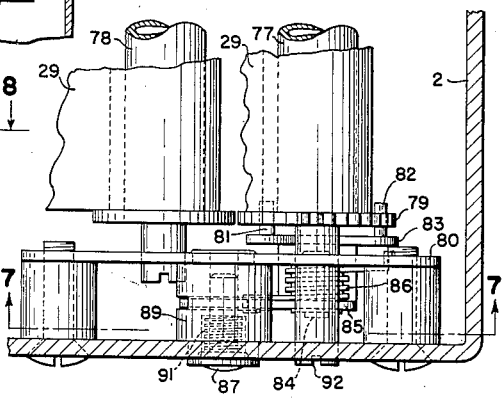
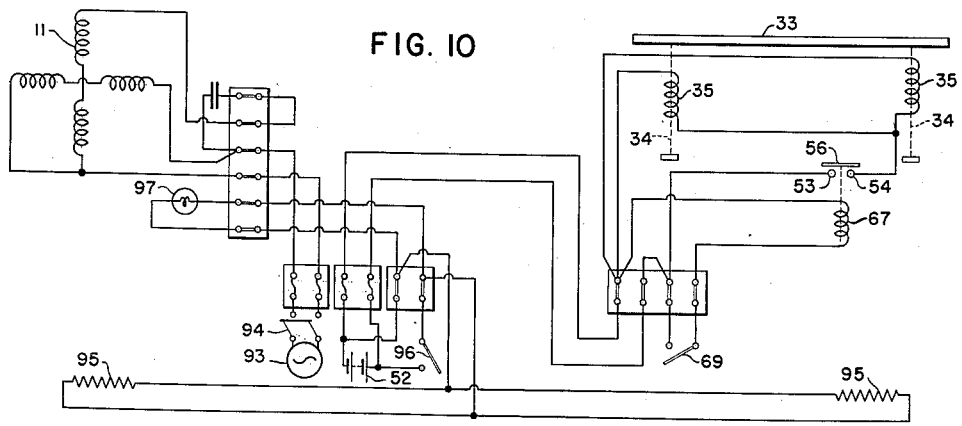
*INVENTOR.*
GEORGE W. BARNES JR
BY
*CB Spangenberg*
ATTORNEY.

Patented Aug. 22, 1950

2,519,537

UNITED STATES PATENT OFFICE 2,519,537

TIME INTERVAL RECORDER

George W. Barnes, Jr., Clifton Heights, Pa., assignor, by mesne assignments, to Minneapolis-Honeywell Regulator Company, Minneapolis, Minn., a corporation of Delaware Application June 7, 1945, Serial No. 598,067

4 Claims. (Cl. 346—78)

The present invention relates to recording instruments, and more particularly to an instrument which may be manually or automatically operated to record the time interval occurring between two or more events.

Many times it is desirable to have an accurate and easily interpreted record that may be used to show the time which has elapsed between the occurrence of two or more events. These events may, for example, be the time occurring between the operations of a machine, or they may be the time required to receive an answer after a signal has been sent. With the instrument of the present invention such a record may be made. This instrument is operated by the closure of an electric circuit as controlled by a switch. The switch may be operated manually by an attendant or it may be operated automatically by a moving part of some machine.

It is an object of the present invention to provide a simple recording instrument which will make a plurality of time records on a moving chart which records may easily be interpreted. It is a further object of the invention to provide a simple means for moving a traveling chart into engagement with an inked ribbon that is backed up by a type plate. The platen which moves the chart into engagement with the ribbon is operated by a pair of simultaneously energized solenoids. These solenoids are deenergized immediately after they have been energized so that the platen may quickly move away from the chart and thereby prevent the record from being blurred.

It is a further object of the invention to provide a novel means for advancing an inked ribbon through the instrument so that freshly inked portions may be placed under the type plate.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 2 is a view taken on line 2—2 of Figure 1,

Figure 3 is a view taken on line 3—3 of Figure 1,

Figure 4 is a view of the rewinding apparatus on line 4—4 of Figure 3,

Figure 5:
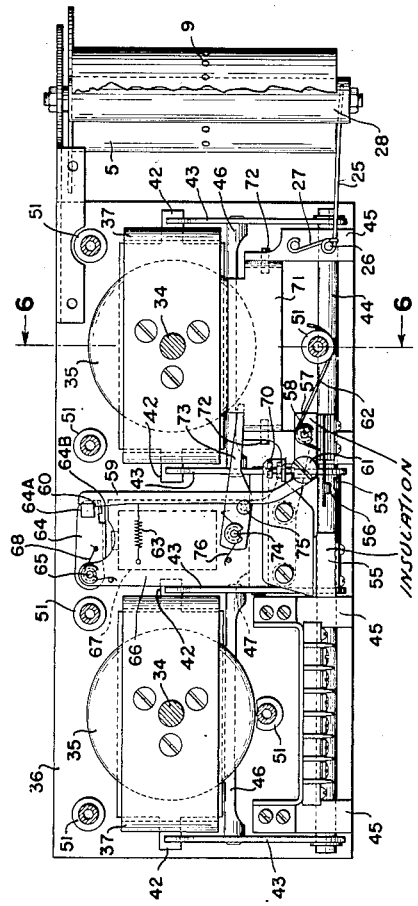
Figure 5 is a view taken on line 5—5 of Figure 2.
Figure 5A:
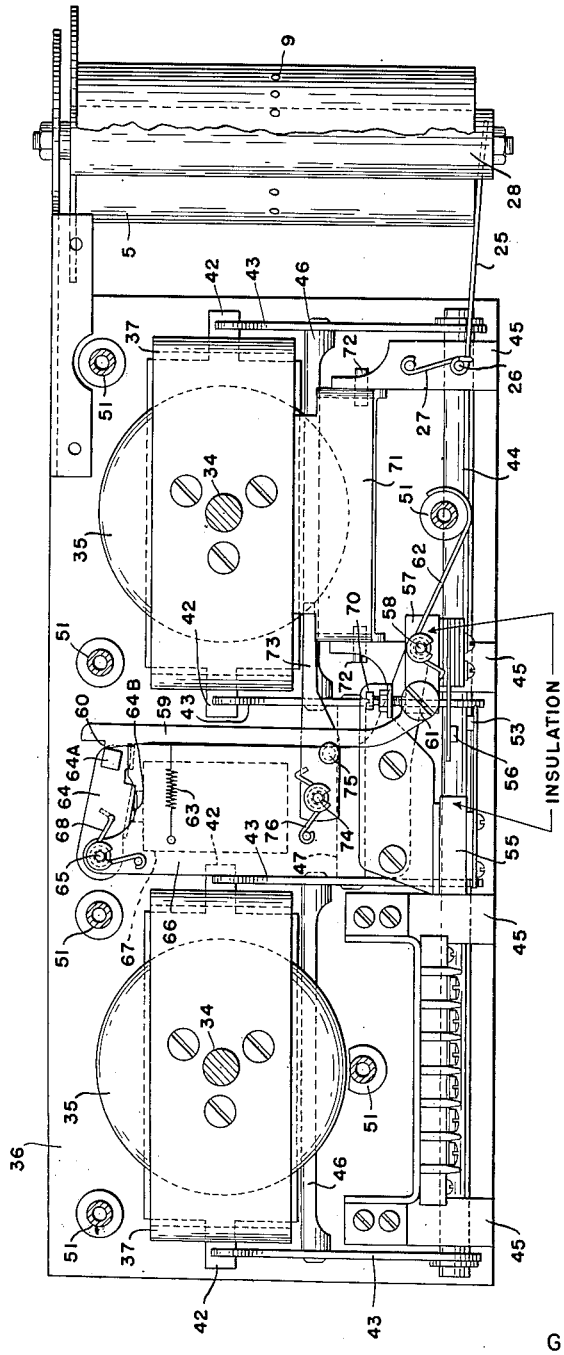

Figure 5A is a view taken on line 5—5 of Figure 2 showing the mechanical linkage between solenoid 67 and movable member 56 in another position.

Figure 1:
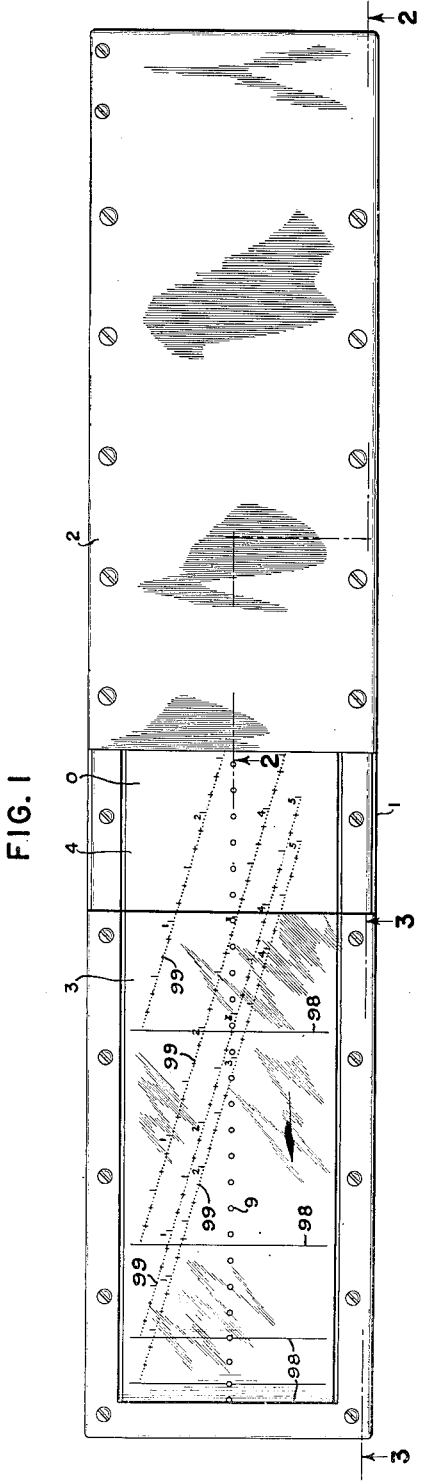
Figure 1 is a top view of the recording instrument.

Figure 6 is a view taken on line 6—6 of Figure 5, and including the casing and top shown in Figure 1, and showing one solenoid in dotted outline only, Figure 7 is an enlarged view of the ink ribbon 20 feeding mechanism, taken on line 7—7 of Figure 8, Figure 8 is a view taken on line 8—8 of Figure 7, Figure 9 is a view taken on line 9—9 of Figure 7, and Figure 10 is a wiring diagram.

Referring first to Figure 1 there is shown a casing 1 that has a top 2 attached to one end thereof and which is provided with a window 3 adjacent the other end thereof. Between the top and the glass of the window is an opening O under which the chart passes so that notations may be written thereon if desired. The chart is shown at 4 and is fed from a supply roll 5, disclosed in Figures 2 and 5 to the left across the top of the instrument to a takeup roll which is disclosed at 6 in Figure 3. The chart is moved through the instrument by means of a drive drum 7 that is provided with a single row of drive pins 8 which cooperate with holes 9 that are formed in the chart. The drive roll 7 is rotated to drive the chart at a given rate of speed, for example, one inch per minute, by means of a constant speed motor 11 that imparts rotation to the drum 7 through a gear train 12.

The takeup roll 6 is mounted upon a drum 13 that is freely rotatable on a shaft 14 which extends from a plate 15 as is best shown in Figure 4. Rotation is imparted to the takeup roll by means of frictional engagement with the surface thereof by a pair of driving rolls 16 that are also driven by the motor 11. These rolls are adjustably attached to a shaft 17 that is mounted in a frame 18 which is pivotally supported on a sleeve 19 that also is attached to and projects from the plate 15. The frame 18 is biased in a clockwise direction in Figure 3 around the sleeve 19 by means of a spring 21 in order to bring friction roll 16 into engagement with the surface of the takeup roll 6 with enough force to rotate this roll. Rotation is imparted to the friction roller 16 by means of a gear 22 that is in mesh with one of the gears in gear train 12 and which is attached to a shaft 23 that projects through the sleeve 19. The other end of the shaft 23 has a gear on it forming part of a gear train 24 to impart the rotation of shaft 23 to shaft 17 of the friction rolls 16. It will, therefore, be seen that as the motor 11 rotates, the driving drum 7 moves the chart across the instrument at a constant rate of speed and that this chart is wound up on the take-up roll by means of engagement between it and the friction rolls 16, which are also driven through a suitable gear train by motor 11. The speed of rotation of rolls 16 is sufficient to wind the chart on the roller 6 when the roll is small and the force of spring 21 is such that friction rollers 16 will slip with respect to the roll 6 as the roll increases in diameter. It is also noted that the supply roll 5 is kept from overrunning by means of a brake 26 that bears against the end of the supply roll. This brake is pivotally mounted on a pin 26 extending between parts of the instrument frame and is biased into engagement with the end of the supply roll by a spring 27 with sufficient force to prevent this roll from rotating freely.

After leaving the supply roll, the chart 4 passes over a freely rotatable guide roll 28 and then passes directly through the instrument to the drive roll 7. The guide roll 28 is so located that it directs the paper between an ink ribbon 29 that is wrapped around a type plate 31 and a platen 32 that is used to force the chart into engagement with the ink ribbon to make impressions thereon. The platen is made of some material such as hard rubber and is backed up by a metal plate 33 that is mounted upon a pair of posts or armatures 34. Each of these posts forms the armature of a solenoid 35 that is located adjacent one end of the printing platen. These solenoids are held in position on a base plate 36 by U-shaped straps 37 that are attached to the plate and that are attached to the solenoids. It is noted that each solenoid is also provided with a pair of tubular guide members 38, one of which is located at the top and one of which is located at the bottom of the core of the solenoid. Each of the armatures 34 is attached at its lower end to a plate 39, this plate being provided with a tubular portion 41 which extends into the lower guide 38 of the solenoid with which it cooperates.

In order to insure that the armatures move together so that the printing platen will be held level as it moves upwardly into engagement with the chart, each of the plates 39 is provided with a pair of tongues 42 that project through suitable opening of the legs of the U-shaped straps 37. Each of these tongues is received by the forked end of an arm 43 that is pivoted to move about a rod 44 which extends across the front of the instrument as shown in Figures 2 and 5. This rod is located by bearing members 45 formed on the base plate 36. The arms 43 which engage the tongues 42 on the opposite ends of each member 39 are joined rigidly by a brace 46. This means that the arms 43 and the brace 46 for each solenoid form a rigid frame that insures that the armature will not have a tendency to tilt. The adjacent arms 43 of each of these frames are rigidly joined by another bar 47 so that the two frames will move in unison. It will be seen that as a result of this structure, all four of the arms 43 are constrained to move together, thus insuring that the two armatures 34 will move simultaneously and the same amount.

Extending between the solenoids or rather between the top of the straps 37 and the printing plate is a reinforcing and supporting plate 49 which is located in the instrument by means of posts 51 extending upwardly from the base plate 36. This supporting plate is provided with openings through which the armatures 34 extend. Upward movement of the printing platen 32 is limited by engagement of the platen with the chart and downward movement of the platen is limited by engagement between the plates 39 and a pair of shock absorbing members 48 that are attached to the plate 36 beneath the center of the solenoids.

In order to get a clear impression of the printing characters on a moving chart, it is necessary that the platen 32 be brought into engagement with the chart 4 and immediately moved out of engagement therewith. This is accomplished in the present instrument by energizing the solenoids 35 to move the platen upwardly into engagement with the chart and to immediately thereafter deenergize the solenoids so that the platen can drop back away from the chart under the action of gravity or suitable springs. This is accomplished by a mechanism which is now to be described. It is noted that the wiring diagram of Figure 10 shows the electrical circuits, the mechanical parts of which are shown best in Figures 2 and 5.

Current is supplied to the solenoids 35 from a battery 52, or another suitable source of direct current, through contacts 53 and 54 that are attached to an insulating block 55. When the circuit to the solenoids is to be closed, a bridging contact 56 is moved into engagement with the contacts 53 and 54. The bridging contact is mounted on and insulated from a support 57 which is pivoted in a suitable manner at 58. An actuating member or pusher arm 59 having a notch or shoulder 60 in its upper end, as shown in Figure 5, is pivoted at 61 to the support 57. A spring 62 is provided to move normally the support 57 in a clockwise direction so that the contacts 56 and 53 and 54 for the solenoids 35 will normally be open. A spring 63 is also provided to move normally the pusher arm 59 in a counterclockwise direction in Figure 5 for a purpose to be described. In order to bring the contact 56 in engagement with contacts 53 and 54, the pusher arm 59 is moved downwardly by means of a projection 64A on an actuating lever 64 that is pivoted at 65 to a supporting plate 66. This movement is accomplished by means of engagement between the portion 64A and the notch 60 on the pusher member 59. The actuating member 64 has, as best shown in Figure 6, turned under portion 64B that forms the armature of a solenoid 67 which is attached to the under side of the plate 66 as shown in Figures 5 and 6. It is noted that the actuating arm 64 is biased normally in a counterclockwise direction in Figure 5 by means of a spring 68. It is also noted that the bridging contact 56 and its supporting member 57 may be adjusted to a given normal position by means of an adjusting screw 70.

In the operation of the device, a switch 69 is closed to energize the solenoid 67. When this occurs, the plate 64B and the arm 64 which carries the projection 64A are moved in a clockwise direction in Figures 5 and 5A thus moving the pusher member 59 downwardly and the support 57 in a counterclockwise direction to connect the contacts 53 and 54 and energize solenoids 35. When this occurs the printing platen is moved upwardly to cause an impression to be made on the chart. This same operation actuates additional mechanism to immediately permit the contacts 56 and 53 and 54 to be opened to deenergize the solenoids 35. To this end there is provided, as best shown in Figures 5 and 6, a U-shaped member 71 that is pivoted at the end of its legs at 72 to extensions of two of the bearing members 45. When the right solenoid 35 in Figure 5, or the solenoid shown in outline in Figure 6 is energized, a magnetic path is also set up through this solenoid and the member 71 to tend to move the member 71 around pivots 72 to bring the upper, cross part thereof toward the strap 37. Movement of the member 71 clockwise in Figure 6 moves an arm 73, which is best shown in Figure 5, and which extends above one of the legs of member 71, counterclockwise around its pivot 74. This arm has a pin 75 on it, which pin bears against the left edge of the pusher arm 59. Since the pin 75 is mounted below the pivot point 74 of the arm 73, counterclockwise movement of this arm in Figure 5 will move the pin 75 to the right enough to move shoulder 60 on the pusher arm 59 out from under the projection 64A. When this occurs spring 62 will immediately move the support 57 around its pivot to separate the contacts 56 and 53 and 54 thereby immediately deenergizing solenoids 35. At any later time the switch 69 may be opened, and when this occurs, actuating arm 64 will be moved counterclockwise in Figure 5 by spring 68 until it is raised enough so that spring 63 can move lever 59 to the left to bring the notch 60 of this lever under the extension 64A. The apparatus is then again in a position to be operated to make another printing impression on the chart whenever switch 69 controlling the energization of solenoid 67 is again closed.

The printing plate 31 and the ink ribbon 29 are attached to the top 2, so that when the top is placed in position on the casing these parts will be above the chart 4. This means that when a record has been made upon the chart, it will be visible from the top of the instrument as the chart is moved from the supply roll 5 underneath the window 3 to the takeup roll. The mechanism by means of which the ink ribbon may be moved forwardly to bring clean portions thereof under the type plate is shown best in Figures 7 to 9 inclusive.

The ink ribbon 29 is supplied from a supply roll 77 and passes across the upper surface of the type plate, as shown in Figure 2, around the left end thereof and back along the underside of the type plate above the paper to a takeup roller 78. This roller is spring wound and thus always keeps the ink ribbon taut. Feeding of the ink ribbon is accomplished manually by means of an escapement mechanism. For this purpose, the supply roll has formed on its end a toothed wheel 79. Cooperating with the teeth of this wheel are a pair of pins 81 and 82 that are mounted on a plate 83 which is pivoted at 84. The pivot, along with the ends of the supply and takeup rolls, are all mounted in a subplate 80 that is suitably attached to the top 2. Also pivoted at 84 and attached to the plate 83 is a lever arm 85. The parts 83 and 85 and the pins carried by the former are biased normally in a clockwise direction in Figure 7 by means of a spring 86. These parts, however, may be moved in a counterclockwise direction in Figure 7 to release toothed wheel 79 and permit the roller 78 to wind the ink ribbon thereon. This movement is accomplished by a push button 87 against which the arm 85 bears. As shown in Figure 9, this push button is provided with a cam notch 88 in which the end of the arm lies. The push button is mounted for sliding movement in a journal 89 that is attached to the subplate 80, the journal being provided with a slot through which the arm 85 may pass.

In the operation of the device, one of the teeth of wheel 79 normally bears against the pin 81 and pin 82 is normally out of engagement with these teeth, as is best shown in Figure 7. When it is desired to advance the ink ribbon, button 87 is pushed, thus moving the arm 85 to the left in Figure 9 or counterclockwise in Figure 7. This movement first moves pin 81 out of engagement with the tooth of the wheel 79 that it engages and moves pin 82 into the path of one of the teeth of this wheel. As the pin 81 moves out of engagement with the tooth on wheel 79, this wheel will be rotated by the pull of the ink ribbon on the supply roll and its rotation will be stopped when one of the teeth of the wheel 79 engages pin 82. As the button 87 is released, spring 86 will move the arm 85 in a clockwise direction in Figure 7 and therefore move pin 82 out of engagement with the tooth of wheel 79 that it is then holding and will move pin 81 into the path of the next tooth on the wheel 79. Thus each time the button 87 is pushed and released, supply roll 77 is rotated through the ink ribbon by the pull of the spring roll 78 an amount equal to one tooth of the wheel 79. When all of the ribbon has been unrolled from the supply roll 77 and wound onto the takeup roll 78, the ribbon may be rewound by inserting a screw driver in the kerf 92 formed on the end of the supply roll and rotating the supply roll in a reverse direction. The escapement mechanism will permit this to be accomplished and such operation will rewind the ink ribbon so that it may again be used.

The wiring diagram for the instrument is shown in Figure 10. This diagram discloses the connections between the direct current source 52 and the two solenoids 35 and solenoid 67. The connections are obvious and a further detailed description thereof is believed to be unnecessary. It is noted that the supply wires are brought to a convenient terminal block that may be located closely adjacent the solenoids. The switch 69, the closure of which energizes solenoid 67, can be operated in any suitable manner. For example, the lead wires to this switch can extend any necessary distance so that the switch may be operated manually or may be mounted on some machine so that it is closed each time the machine performs some designated operation. The wiring diagram also shows that a suitable source of alternating current 93 is supplied through a switch 94 to the chart drive motor 11. The motor is herein disclosed as being a rotating field inductance motor but it may be any other type of electric motor that produces a constant speed. There is also shown in Figure 10 a pair of heaters 95 that may be located at suitable points in the casing 1 to keep the instrument dry and prevent the chart from changing length due to changes in humidity to which it may be subjected. These heaters are also supplied with current from the D. C. potential source 52 through a switch 96. Placed in parallel to the heaters 95 is a signal lamp 97 so that an operator may know when the heaters are energized.

In Figure 1 there is shown the type of record which is made by this instrument. From the figure it will be seen that the printing plate is so formed that a vertical line 98 will be made across the chart and that a line 98 will be made diagonally lengthwise of the chart which consists of a series of dots and numerals. It is intended in the showing herein that the distance between each of the dots represent two seconds, between each of the plus marks represent ten seconds, and between each of the numerals represent one minute. Therefore the vertical line 98 and the diagonal line 99 give an indication on the chart when a record was made and a reading for five minutes thereafter. From an inspection of the chart in Figure 1 it will be seen that there are four vertical lines. It will also be seen that the time elapsed between the first or left and the second records that were made is shown by the number of dots on the first diagonal line which occurs between the first two vertical lines. In a similar manner the time occurring between the second and the third records is indicated by the number of dots appearing on the second diagonal line between the second and third vertical lines, while the time occurring between the first and third records is indicated by the number of dots on the first diagonal line between the first and third vertical lines. It is, of course, supposed that the records will be made less than five minutes apart since the record shown herein is only numbered up to five. If, however, the instrument is to be used when the intervals between each record are longer, then the diagonal line could be extended farther and more numerals could be placed thereon.

Since the chart is moving toward the left at a constant rate of speed and each of the dots indicates a given lapse of time, it is easy to determine from a quick inspection of the record the elapsed time occurring between each record. The space O left between the window 3 and the top of the cover 2 can be used to make suitable notations on the chart if it is desired. The type of record which is produced by the instrument of the present invention is merely intended to indicate the time that elapses between any two of a series of events. The record made is easily understood and is easily read even though the impressions made on the chart may be at irregular or at very close intervals. The mechanism by means of which the records are made is simple and one that is very unlikely to get out of adjustment.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a recording instrument having a chart upon which a record is to be made, the combination including, printing means, a platen to move the chart into engagement with the printing means, and means to operate said platen comprising a solenoid, a core for said solenoid attached to said platen, means to energize said solenoid including a switch having a pair of contacts, a first pivoted lever upon which one of said contacts is mounted, means to bias said first lever in a direction to open said contacts, a second lever having a notch formed therein pivoted to said first lever, a member engaging said notch to move said second lever and thereby said first lever to a position to close said contacts and energize said solenoid, and means operated by said solenoid when it is energized to pivot said second lever on said first lever and disengage said notch and member whereby said first lever may move under its bias to open said contacts.

2. In a recording instrument having a chart upon which a record is to be made and an inked ribbon to make a record on the chart, the combination of, a printing plate, the inked ribbon extending around said printing plate, supply and take-up rolls for said ribbon located adjacent one end of said printing plate, spring means to bias normally said take-up roll in a direction to wind said ribbon thereon and to maintain said ribbon taut, a ratchet on said supply roll, an oscillating plate, a pin on said plate to engage a tooth of said ratchet to prevent said supply roll from rotating, means to bias normally said plate in a position for said pin to engage a ratchet tooth, and cam means engaging with said plate operable upon movement thereof to shift said plate to a position in which said pin is out of engagement with the teeth of said ratchet.

3. In a recording instrument, marking means including a movable member, electrical motor means to move said member, an electric circuit including a switch the closure of which energizes said motor means, a switch actuating lever, means to bias said lever in a switch opening direction, a member to move said lever in switch closing direction, relay means to operate said last mentioned member and thereby move said lever against its bias to switch closing position to energize said motor means, and means operated by said motor means as it is energized to move said lever out of engaging position with said last mentioned member whereby said lever may move quickly under its bias to switch opening position.

4. In a recording instrument having an inked ribbon, the combination including, a stationary plate having type on it, a platen movable toward and away from said plate, a supply roll for a chart, a takeup roll for said chart, said rolls being arranged so that a portion of the chart is located between said plate and said platen, a supply roll for the ribbon, a spring wound take up roll for the ribbon, and means to control the rotation of the supply roll and thereby the feed of the ribbon comprising a ratchet wheel attached to said supply roll, a pin to engage a tooth on said ratchet wheel, movable means to support said pin in a normal position in which it engages a tooth on said ratchet wheel and thereby prevents rotation of the same, and mechanism to move said movable means to a position in which said pin does not engage said ratchet wheel.

GEORGE W. BARNES, Jr.

REFERENCES CITED

The following references are of record in the file of this patent:

UNITED STATES PATENTS

| Number | Name | Date |
|---|---|---|
| 443,788 | Ongley | Dec. 30, 1890 |
| 796,675 | Rypinski et al. | Aug. 8, 1905 |
| 948,562 | Hughes | Feb. 8, 1910 |
| 1,133,597 | Wilson | Mar. 30, 1915 |
| 1,858,332 | Kunze | May 17, 1932 |
| 1,979,208 | Friden | Oct. 30, 1934 |
| 2,099,955 | Edwards | Nov. 23, 1937 |
| 2,198,139 | Svensson | Apr. 23, 1940 |
| 2,259,677 | Abbott et al. | Oct. 21, 1941 |
| 2,266,825 | Streckfuss | Dec. 23, 1941 |